Patented May 24, 1938

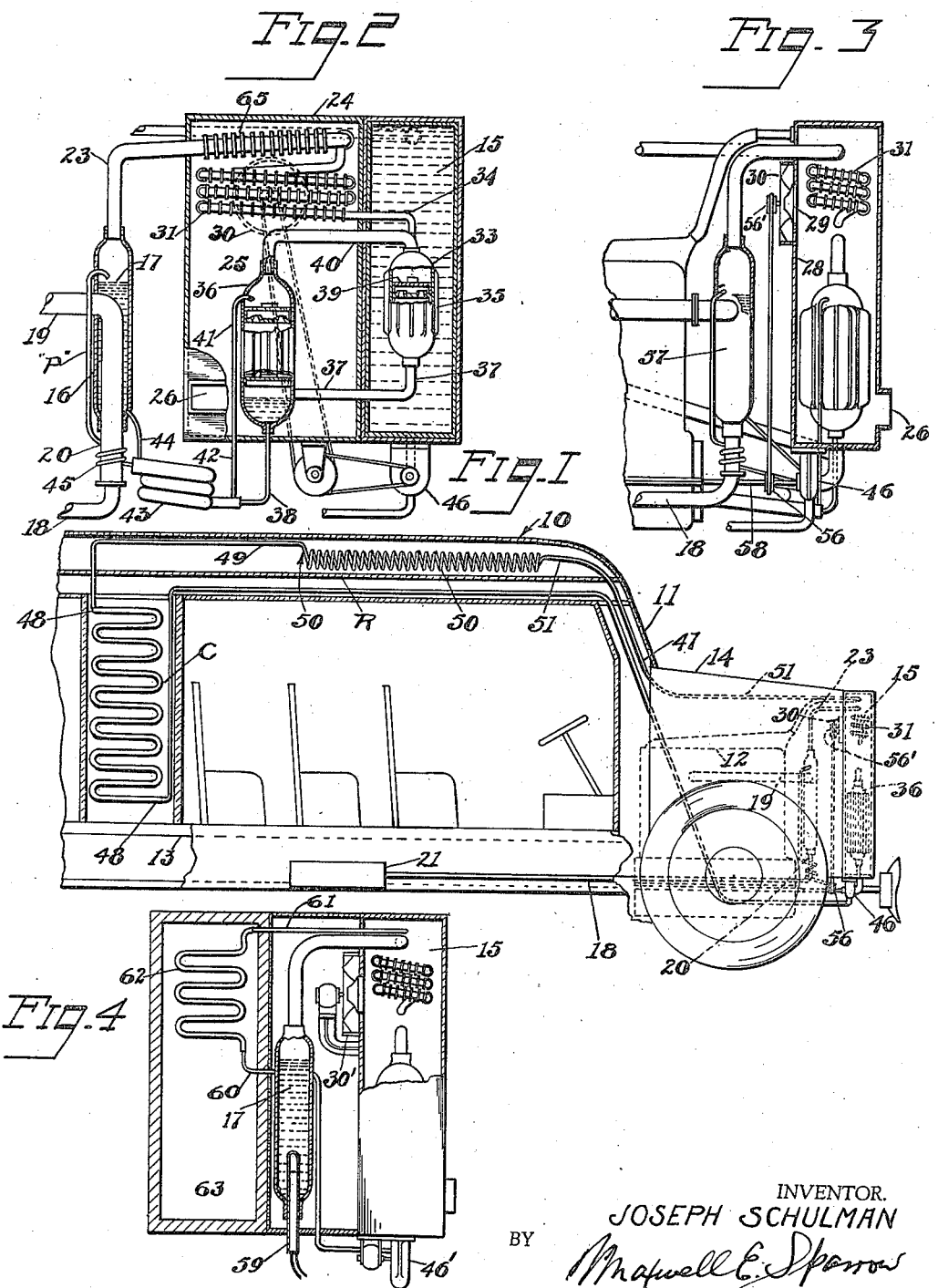

2,118,739

UNITED STATES PATENT OFFICE 2,118,739

COOLING SYSTEM

Joseph Schulman, New York, N. Y.

Application July 22, 1936, Serial No. 91,833

1 Claim. (Cl. 62—119.5)

This invention relates to cooling systems. It has particular application to vehicles in which the temperature of a liquid, such as, for example, water, is reduced by absorption refrigerating apparatus wherein the generator is heated by waste heat; but the invention may be used to cool any chamber in which case the heat may be applied to the generator by any suitable instrumentality.

It is an object of this invention to adapt absorption refrigerating apparatus in a cooling system for vehicles and chambers.

In the absorption refrigerating system preferably employed in this invention, the temperature of the circulating cooling fluid is reduced by a self-contained, hermetically-closed refrigerating apparatus wherein the circulation of the refrigerant, is effected entirely under the influence of factors within the apparatus. More particularly, when applied to a motor vehicle, the circulation of the fluids both liquid and gaseous of the refrigerating apparatus is effected exclusively by the application of waste heat, such as for example, that of the vehicle engine.

It is a further object of this invention to simplify the construction of absorption refrigerating apparatus to make the same more practical and suitable for the attainment of the above object.

Accordingly the refrigerating member or evaporator is surrounded by the fluid used for cooling the engine and vehicle body or the chamber, as the case may be, in association with a positively driven pump, and in a separate compartment the radiator, condenser and absorber are subjected to the action of a cooling fluid such as air circulated by a positively driven exhaust fan.

The above and other objects, purposes and advantages are attained by the novel design, construction and arrangement of parts, as hereinafter described and illustrated in the accompanying drawing, and in which:

Fig. 1 is a sectional view of the forward part of a motor vehicle bus embodying the invention.

Figs. 2 and 3 are detailed sections of parts of the absorption refrigerating system which are shown as being contained in a vehicle radiator casing and under the hood of the vehicle.

Fig. 4 is a detailed section of the absorption system as applied for refrigeration of, for instance, a chamber or room.

In the drawing there is disclosed the forward part of a motor vehicle bus 10 having a body 11, internal combustion engine 12 mounted on the chassis 13 and covered by a hood 14, and the conventional water tank or case 15. The cooling system employed in this invention utilizes the conventional absorption refrigerating system now well known in the art and which is described generally in my Patent No. 1,806,712, dated May 26, 1931. As disclosed in said patent and referring to the drawing of this application, a generator 16 contains the cooling agent, which may be, for instance, ammonia, dissolved in a suitable absorption liquid such as water, the solution being indicated at 17. Any other suitable cooling agent may be employed. The generator is heated by the products of combustion from the internal combustion engine 12, and for this purpose the exhaust manifold 18 is connected by a pipe 19 with a heating element or chamber 20 disposed within the generator 16. From the bottom of chamber 20 the exhaust gases pass to the muffler 21 as by a pipe 22 leading out of the bottom of the chamber 20 and passing through the bottom of the generator 16.

A pipe 23 connects the top of generator 16 with a radiator 24 located within a compartment 25. An opening 26 is provided in the lower portion of wall 27 of compartment 25 for the entrance of a cooling medium such as air. At the upper portion of opposite wall 28 of compartment 25 there is provided another opening 29 at the mouth of which is located an exhaust fan 30 or other air circulating instrumentality driven by any suitable means such as the engine to which it is operatively and positively connected through shaft 58, pulleys 56, 56' and belt 57, to draw in air from opening 26 through compartment 25 and out from opening 29.

The circulation of air through compartment 25 will cool the radiator 24 and other apparatus of the absorption refrigerating system positioned therein to be presently described. Radiator 24 may comprise a relatively large pipe provided with radiating fins 65 and may lie in an inclined position as shown in Fig. 2. As well-known in the art, one purpose of radiator 24 is to condense vapor of the absorption liquid, which vapor is steam in the instant case, and to return the condensate thus produced to generator 16.

Located within compartment 25 is a condenser 31, connected at one end wall to the upper end of radiator 24 by a pipe 32. The other lower end of condenser 31 is connected to the upper portion of a refrigerating member or evaporator 33 by a pipe 34. Evaporator 33 is positioned in tank 15. The evaporator 33 may be provided with radiating vanes or fins 35 to facilitate the transfer of heat from the surrounding water in tank 15 to the evaporator. Located within lower portion of compartment 25 is an absorber 36 having radiating vanes or fins similar to those provided for the evaporator 33 for cooling purposes. The lower portion of evaporator 33 is connected to the lower portion of absorber 36 by means of a pipe 37. A pipe 38 connects the lower portion of evaporator 33 and one end of a jacket or conduit 43. A pipe 40 connects the upper portion of absorber 36 with the upper portion of evaporator 33 for returning the auxiliary agent such as hydrogen employed in the absorption refrigerating system. The interior of evaporator 33 is customarily provided with a plurality of perforated discs 39 positioned one above the other. The absorber 36 is also provided with a plurality of perforated discs 41. A pipe 42, opens at its upper end into absorber 36 and connects at its lower end with said end of the jacket 43.

The other end of the jacket is connected by means of a pipe 44 to the lower portion of generator 16. The pipe 44 connects the lower portion of absorber 36 with an auxiliary heater 45 positioned around chamber 16. The pipe 44 passes through the jacket 43. A pipe P is connected to the auxiliary heater 45 and discharges into the generator at a point slightly above the level of the liquid therein.

The above generally describes a conventional absorption refrigerating system, wherein heat is applied to generator 16 and the water cooling takes place at the evaporator 33. By virtue of the operation of the device in a manner well known in the art, the evaporator 33 cools the water or other fluid contained in tank or case 15. The cooled water is pumped from tank 15 by means of a pump 46 (which may be positively operated by the vehicle engine) through the coils comprising the circulating system for the vehicle body and its refrigerating chamber. This cooling means is shown as comprising a pipe line 47 connecting at its lower end with the pump 46. This pipe line may be brought to the upper portion of the vehicle under the roof R, and then down and connected to the lower end of a coil 48 within a compartment C. The upper end of the coil 48 is connected by a pipe line 49 to one end of another coil 50 arranged at the top of the vehicle body, the other end of the coil 50 being connected to one end of a pipe line 51, the other and lower end of the pipe line 51 terminating in the upper part of tank 15. When the device is in operation, the pump causes a circulation of the cool water from tank 15 through the various pipe lines and coils just mentioned, the water returning into the tank from the top thereof through the pipe line 51.

Fig. 4 shows the application of an absorption refrigerating system to a room or other chamber. In this instance the system is heated electrically as by means of an electric coil 59, though any other suitable heating means may be employed. The exhaust fan 30' in this case is preferably electrically operated and the pump 46' is likewise preferably electrically operated. In a manner hereinabove stated, the evaporator cools the fluid in tank 15' and the cooled fluid is pumped from the tank by means of the pump 46' through the pipe lines 60, 61, and intervening coil 62, the water returning into the tank through pipe line 61. Coil 62 is within chamber 63 which is thereby cooled.

I desire it understood that the invention is not to be confined to the particular forms shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained and new results accomplished, as it is obvious that the particular embodiments herein shown and described are only some of many that can be employed to attain these objects and accomplish these results.

Having described my invention what I claim as new and desire to secure by Letters Patent, is:—

A cooling system for a vehicle wherein waste heat is developed as a result of supplying energy to run the vehicle engine, comprising an absorption type of refrigerating system operated by the waste heat, said system including an absorber and condenser, air-circulating means including an exhaust fan for cooling the absorber and condenser, a receptacle, an evaporator in the receptacle and operatively connected with the condenser and absorber, said receptacle adapted to contain a fluid to be cooled by the evaporator, a pipe line in the vehicle and having a return in said receptacle, and a pump connected between said receptacle and said pipe line for circulating the cooled fluid through the pipe line, said fan and pump being driven by the vehicle engine.

JOSEPH SCHULMAN.